United States Patent
Hu et al.

[11] Patent Number: 5,900,348
[45] Date of Patent: May 4, 1999

[54] CYANINE DYES MIXTURE AS OPTICAL RECORDING MEDIA

[75] Inventors: Andrew Teh Hu, Hsinchu; Hong-Ji Lee, Taoyuan Hsien; Jian-Liang Huang; Jen-Cheng Chang, both of Taoyuan; Shi-Jae Ye, Kaohsiung Hsien; Der-Ray Huang, Hsinchu; Don-Yau Chiang, Hsien; Wen-Yih Liao, Taichung; Tzuan-Ren Jeng, Tou-Lu; Jin-Sen Chen, Hsinchu, all of Taiwan

[73] Assignees: National Tsing Hua University; Industrial Technology Research Institute, both of Hsinchu, Taiwan

[21] Appl. No.: 08/900,063

[22] Filed: Jul. 23, 1997

[30] Foreign Application Priority Data

Dec. 12, 1996 [TW] Taiwan ................................ 85115460

[51] Int. Cl.[6] .............................. G11B 7/24; G03C 1/73; G02B 5/22
[52] U.S. Cl. .................... 430/270.21; 430/945; 252/586; 252/587
[58] Field of Search ........................... 430/270.18, 270.2, 430/270.21, 945; 252/586, 587

[56] References Cited

U.S. PATENT DOCUMENTS

| | | | |
|---|---|---|---|
| 4,600,625 | 7/1986 | Abe et al. | 430/945 |
| 4,767,693 | 8/1988 | Oba et al. | 430/270.19 |
| 4,999,281 | 3/1991 | Inagaki et al. | 430/270.21 |
| 5,019,476 | 5/1991 | Kanno et al. | 430/945 |
| 5,213,955 | 5/1993 | Hamada et al. | 430/270.2 |
| 5,292,615 | 3/1994 | Yamada et al. | 430/945 |
| 5,328,802 | 7/1994 | Yanagisawa et al. | 430/945 |
| 5,332,608 | 7/1994 | Tsuji et al. | 430/945 |
| 5,424,171 | 6/1995 | Yanagisawa et al. | 430/945 |
| 5,455,094 | 10/1995 | Miyadera et al. | 430/945 |
| 5,512,416 | 4/1996 | Namba et al. | 430/270.21 |

OTHER PUBLICATIONS

The Chemistry of Synthetic Dyes, vol. II, by K. Venkataraman, pp. 1143–1186, Academic Press, New York, 1952.

"Dye–in–polymer films for ablative optical recording with GaAs diode lasers", Appl. Phys. Lett., K.Y. Law, P.S. Vincett and G.E. Johnson, 39, 718, 1981.

Hamer, F.M., "The cyanine dyes and related compounds" Wiley Interscience, pp. 684–705, Jul. 1964.

Shoemaker D.P., et al., Experiments in Physical Chemistry McGraw–Hill, Inc. pp. 412–418, 1981.

*Primary Examiner*—Martin Angebranndt
*Attorney, Agent, or Firm*—Rabin & Champagne P.C.

[57] ABSTRACT

A cyanine dye for using in optical disc recording medium, having the following structure:

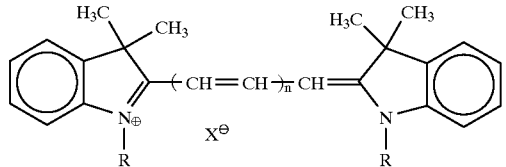

wherein R represents 4-methoxycarbonyl benzyl group, $X^-$ represents an acid anion, and n represents am integer of 2 or 3. This cyanine dye is suitable for use as a near infrared light-absorbing organic dye useful as an optical disc recording medium.

15 Claims, 3 Drawing Sheets

CYANINE DYES MIXTURE AS OPTICAL RECORDING MEDIA

BACKGROUND OF THE INVENTION

1. Field of the Invention

The invention relates in general to cyanine dyes mixture for optical recording media.

2. Description of the Related Art

A storage medium with higher storage density, smaller size and lower cost is extremely required now-a-days. As magnetic storage medium is not able to satisfy these requirements, optical storage material is greatly sought for as an alternative. It is found that organic dye which combines the advantages and characters of both the photosensitizer and photorecording medium, is highly developed and adopted for optoelectronic industry. The applications of organic dye include in the fields of, for example, nonlinear optical device, recording and displaying of optical disc data, photoresist, sensor and indicator for heat, light, and electron, during the transfer and storage of energy, medicine and biology, etc. The cyanine dyes mixture of this invention has high absorption coefficient in the infrared region which implies that the cyanine dye has high recording sensitivity and signal to noise ratio (S/N) value. Therefore, cyanine dyes mixture is an ideal optical memory storage material.

An organic dye, cyanine blue, was first synthesized by Greville Williams in 1856 (K. Venkataraman (ed.), The Chemistry of Synthetic Dyes, Vol.II, p.1143–1186, Academic Press, New York, 1952). In 1875, Vogel discovered that cyanine blue has special photosensitizing properties. Therefore, cyanine blue, which was originally used as colorant, turned to be a photosensitizer with higher added value. Different structures of cyanine dye have different λmax which varies from UV to IR. Therefore, cyanine dye can also serve as photosensitizer for photoresist or optical storage medium in electronic industry besides a colorant.

Cyanine dye, 3,3'-diethyl-12-acetyl-thiatetracyanine perchlorate, was first proposed for application in optical disc fabrication by Law et al. (K. Y. Law, P. S. Vincett, and G. E. Johnson, Appl. Phys. Lett., 39, 718 (1981)). The cyanine dye and PVAc (poly(vinyl acetate)) were first mixed and then spin-coated to form an optical recording medium. After this successful application, several kinds of cyanine dye were developed for optical disc applications, such as those disclosed in U.S. Pat. Nos. 5,019,476, 5,292,615, 5,328,802, 5,332,608, 5,424,171 and 5,455,094, etc. As to the method of fabrication, it is found that spin coating of the dye on the substrate can shorten the process and reduce the cost as compared to the chemical vapor deposition (CVD) process; therefore spin coating is accepted as the standard procedure, and the stability of the organic dye and its solubility to organic solvent are critical factors for successful applications.

SUMMARY OF THE INVENTION

The objective of this invention is to provide cyanine dyes mixture (Ia and Ib) with λmax in near infrared region (650 nm~780 nm) for use as optical recording media, and this cyanine dyes mixture is thermally stable for laser writing, and soluble in organic solvent for spin coating and has the following structural formula:

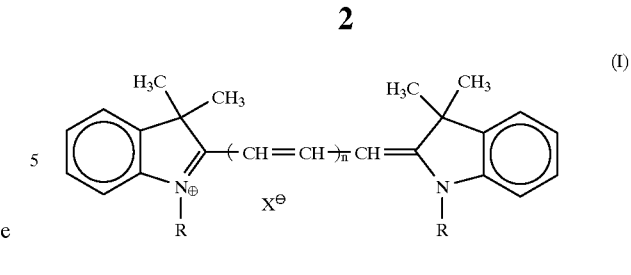

(I)

wherein R represents

$X^-$ represents an acid anion, and n represents an integer of 2 or 3. For cyanine dye (Ia), n=2; and for cyanine dye (Ib), n=3.

BRIEF DESCRIPTION OF THE DRAWINGS

Other objectives, features, and advantages of this invention will become apparent from the following detailed description of the preferred but non-limiting embodiments. The description is made with reference to the accompanying drawings in which.

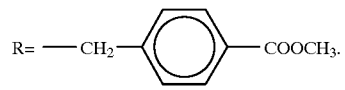

Figure 2:
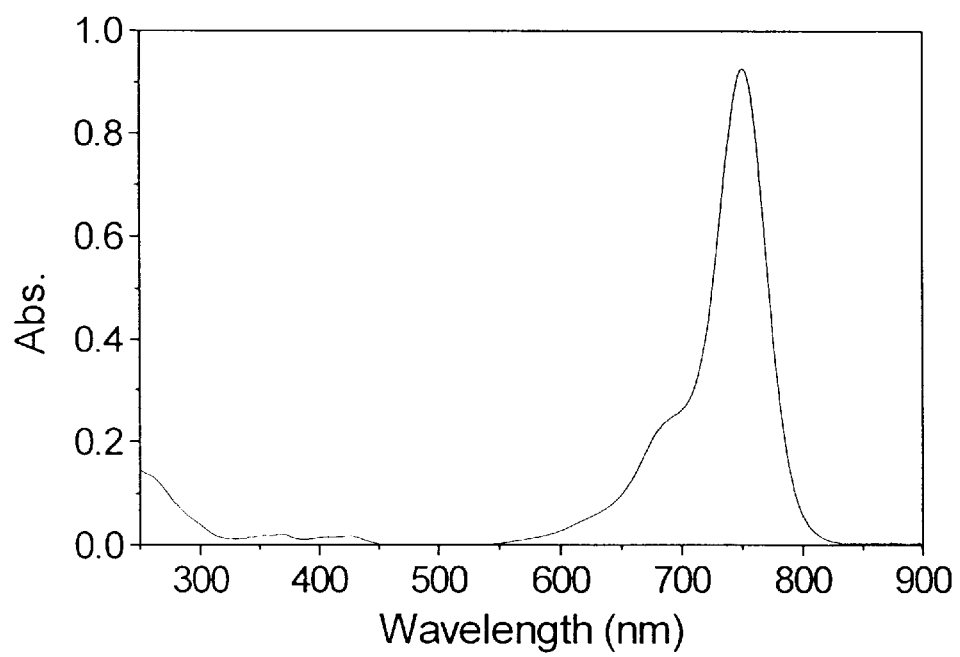

FIG. 2 shows an absorption spectrum of the cyanine dye (Ib) where n=3, $X^-=ClO_4^-$,

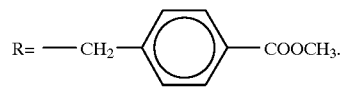

Figure 3:
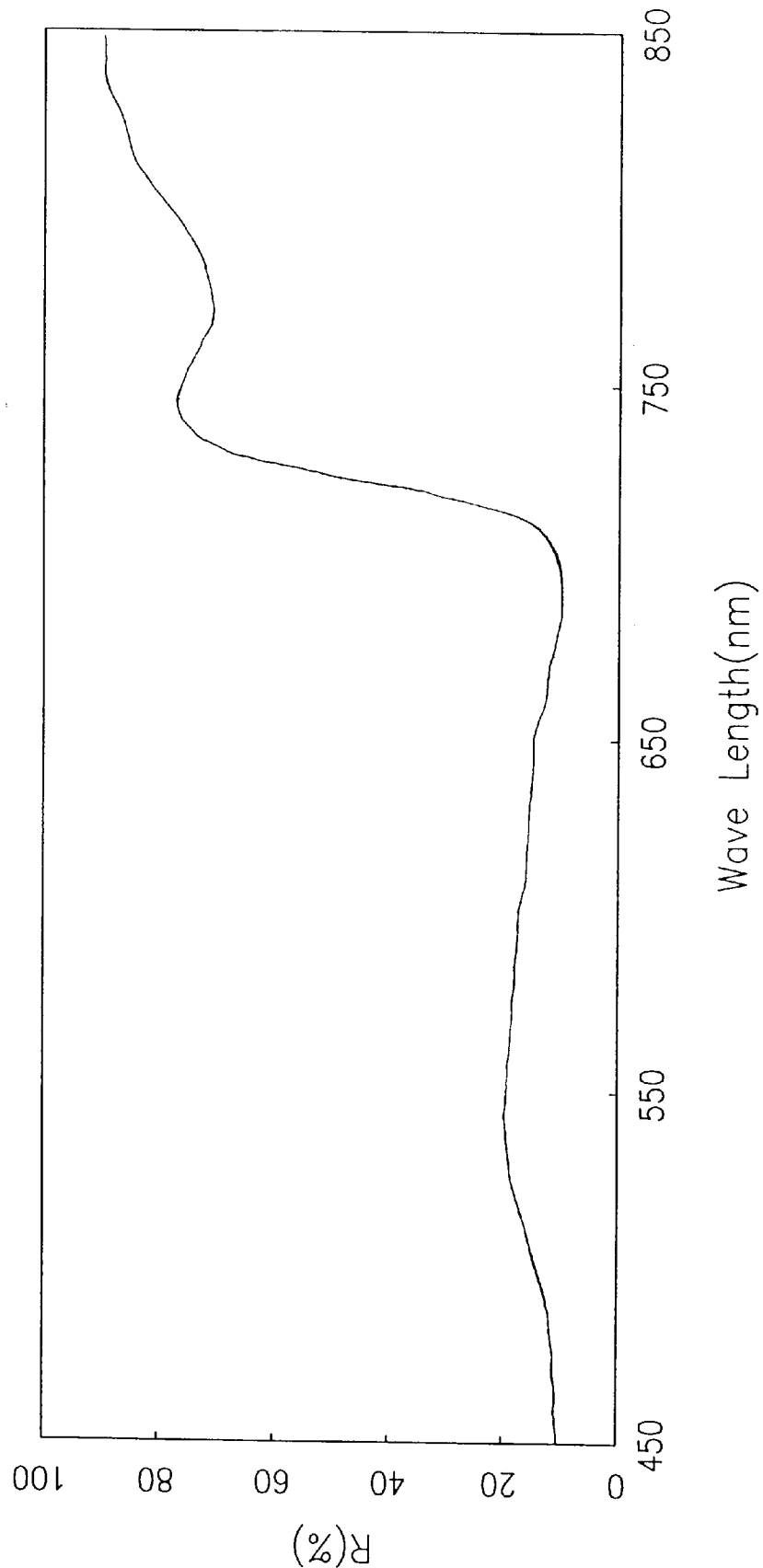

FIG. 3 shows a reflecting spectrum of the dyes mixture layer on optical recording disc.

Figure 4:
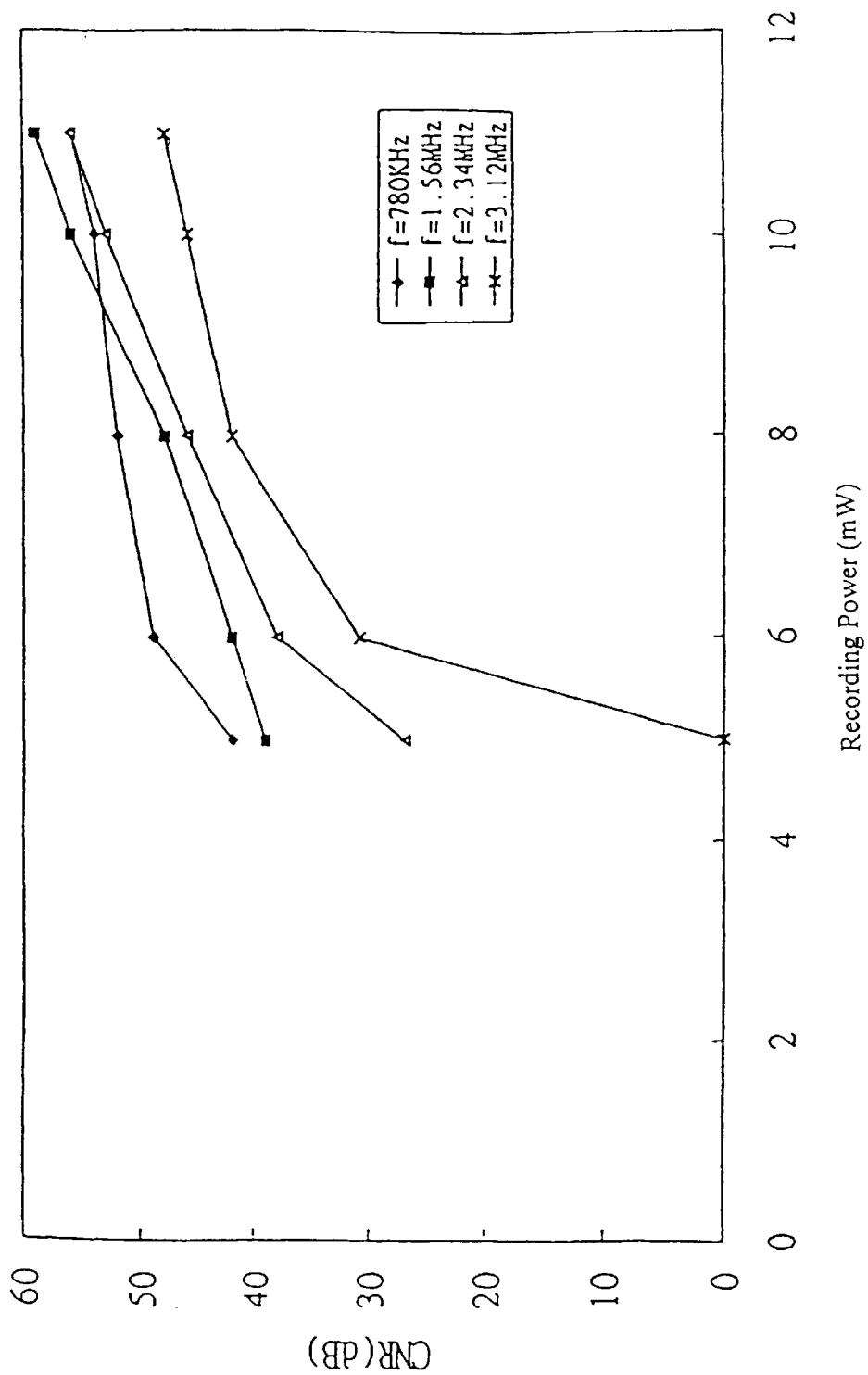

FIG. 4 shows the value of carrier/noise ratio (CNR) and recording power at different frequencies, using a dynamic test.

DESCRIPTION OF THE PREFERRED EMBODIMENT

The structural formula of cyanine dyes mixture of this invention is shown as follows:

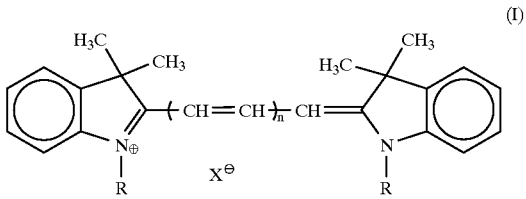

(I)

wherein, R is

X⁻ is an acid anion, and n is 2 and 3. Preferably, X⁻ is halogen anion, (such as Cl⁻, Br⁻, I⁻, etc.), alkylsulfate anion, (such as $CH_3SO_4^-$, $C_2H_5SO_4^-$, n-$C_3H_7SO_4^-$, etc), arylsulfonate anion, (such as

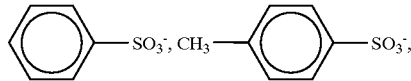

and perchlorate anion, (such as $ClO_4^-$, etc.). This cyanine dye is thermally stable and soluble in various organic solvents.

Preparation of 1-(4"-methoxycarbonyl)benzyl-3,3-dimethyl-1'-(4"-methoxycarbonyl)benzyl-3',3'-dimethylindo-2;2'-pentamethineperchlorate (Ia)

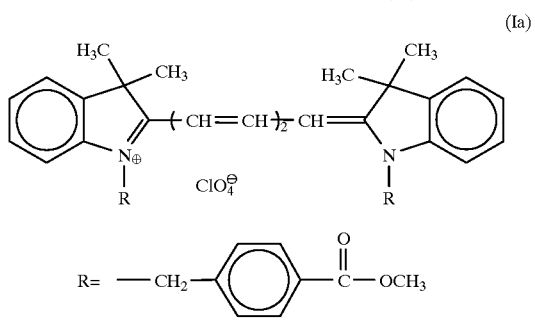

(Ia)

Preparation of 1-(4"-methoxycarbonyl)benzyl-3,3-dimethyl-1'-(4"-methoxycarbonyl)benzyl-3',3')-dimethylindo-2;2'-pentamethineperchlorate includes three steps: first, synthesizing the substituent of methyl(4-iodomethyl)benzoate, second, synthesizing 1-(4'-methoxycarbonyl)benzyl-2,3,3-trimethyl indoleninium iodide, and then reacting the latter compound with 3-anilinoacrylaldehyde anil.

A mixed solution of methanol (0.32 g, 0.01 mole), (4-chloromethyl)benzoyl chloride (1.89 g, 0.01 mole) and pyridine (0.79 g, 0.01 mole) was heated to 40° C. for 3 hours to give methyl(4-chloromethyl)benzoate. The latter was stirred with sodium iodide in dried acetone at 40° C. for 3 hours to give the crude material, and then the mixture was isolated by filtration. The filtrate was evaporated and recrystallized from a mixture of methylene chloride and hexane (1:1) to give light yellow crystals, methyl(4-iodomethyl) benzoate. The yield was 2.48 g (90%), mp 67° C.

A mixture of methyl(4-iodomethyl)benzoate (2.76 g, 0.01 mole) and 2,3,3-trimethylindolenine (1.752 g, 0.011 mole) was heated in benzene at 80° C.–85° C. for 6 hours. The solution was evaporated and recrystallized by ethyl acetate to give light yellow crystals of 1-(4'-methoxycarbonyl) benzyl-2,3,3-trimethyl indoleninium iodide. The yield was 3.09 g (71%), mp 109° C.

Figure 1:
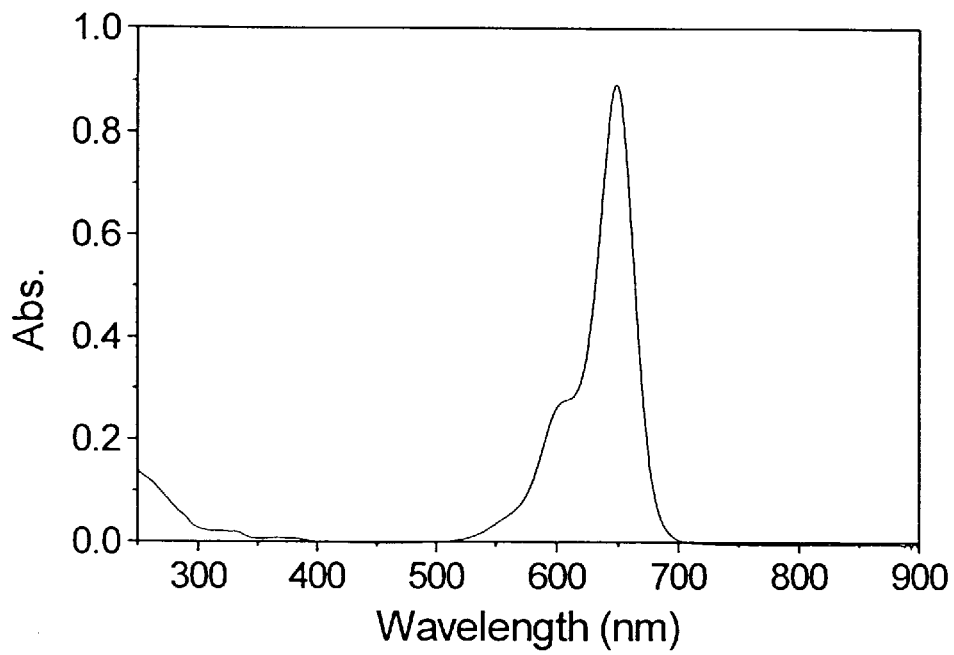
FIG. 1 shows an absorption spectrum of the cyanine dye (Ia) where n=2, $X^-=ClO_4^-$.

A solution of 1-(4'-methoxycarbonyl)benzyl-2,3,3-trimethyl indoleninium iodide (6.16 g, 0.014 mole), 3-anilinoacrylaldehyde anil (2.07 g, 0.008 mole), and sodium acetate (1.312 g, 0.016 mole) in 20 ml of acetic anhydride was heated at 100° C. for 2 hours. After cooling, the reaction mixture was poured into 140 ml of an aqueous solution of sodium perchlorate containing 1.95 g (0.016 mole) of sodium perchlorate. The mixture was warmed with stirring for a short time. Then crystals were separated from the mixture by filtration, washed with methanol and were then dissolved in dichloromethane under heat. The solution was washed with water several times and then evaporated. The residue recrystallized from ethanol several times to give blue crystals of 1-(4"-methoxycarbonyl)benzyl-3,3-dimethyl-1'-(4"-methoxycarbonyl) benzyl-3',3'-dimethylindo-2,2'-pentamethineperchlorate I(a). The yield was 3.68 g (70%), mp 201° C. FIG. 1 shows that λmax (EtOH) is 648 nm. $\epsilon_{648}=2.225\times10^5$ cm⁻¹M⁻¹.

Preparation of 1-(4"-methoxycarbonyl)benzyl-3,3-dimethyl-1"-(4'-methoxycarbonyl)benzyl-3',3'-dimethylindo-2;2'-heptamethineperchlorate (Ib)

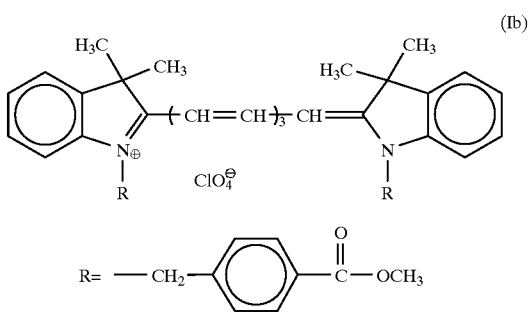

(Ib)

A solution of 1-(4'-methoxycarbonyl)benzyl-2,3,3-trimethyl indoleninium iodide (6.16 g, 0.014 mole), 1-anilino-5-anilinopenta-1,3-diene hydrochloride (2.29 g, 0.008 mole), and sodium acetate (1.312 g, 0.016 mole) in 20 ml of acetic anhydride was heated at 100° C. for 2 hours. After cooling, the reaction mixture was poured into 140 ml of an aqueous solution of sodium perchlorate containing 1.95 g (0.016 mole) of sodium perchlorate. The mixture was warmed with stirring for a short time. Then crystals were filtered from the mixture, washed with methanol and were then dissolved in dichloromethane under heat. The solution was washed with water several times and then evaporated. The residue recrystallized from ethanol several times to give green crystals of 1-(4"-methoxycarbonyl)benzyl-3,3-dimethyl-1'-(4"-methoxycarbonyl)benzyl -3',3'-dimethylindo-2;2'-heptamethineperchlorate (Ib). The yield was 4.08 g (75%), mp 213° C. FIG. 2 shows that λmax (EtOH) is 750 nm. $\epsilon_{750}=2.267\times10^5$ cm⁻¹M⁻¹.

Sample Preparation of Optical Recording Medium

Dye (Ia) and (Ib) were used as optical recording media. Dye (Ia) and dye (Ib) are both dissolved in 2,2,3,3-tetrafluoropropanol to make up a solution of 100 g. However, the solvent is not limited to 2,2,3,3-tetrafluoropropanol, it can be an alcohol, ketone, ether or chloroform, dichloromethane, or dimethylformamide, etc. The weight percentage of dye (Ib) to dye (Ia) can be 1% to 8%, and preferably 3.5% to 5%. The weight percentage of dye (Ia) to the total make-up solution can be 0.5% to 5%, and preferably 1.3% to 1.7%. In the preferred embodiment of this invention, 1.5 g of dye (Ia) and 0.075 g of dye (Ib) are dissolved in 2,2,3,3-tetrafluoropropanol to form a 100 g solution. The dyes were then coated onto a 1.2 mm blank polycarbonate (PC) substrate by a spin coater, through a dipping process at 30~500 rpm for 2~10 seconds, a spin out process at 1000~3000 rpm for 10~30 seconds and a baking process at 2000~5000 rpm for 10~30 seconds. The recording layer has a thickness of about 1000 Å~2500 Å. On the top of the dye recording layer, a reflection layer of gold, having a thickness of about 1000 Å, was sputtered. Finally, a protection layer of 1 μm was lacquered.

FIG. 3 shows a reflecting spectrum of dyes mixture on optical recording disc. At 780 nm. the reflection rate reaches 70%. Moreover, using dynamic test, carrier/noise ratio (CNR) can be more than 47 dB at a frequency of 1.56 MHz and a recording power of 8 mW, as shown in FIG. 4. CNR can be more than 46 dB at a frequency of 3.12 MHz and a recording power of 11 mW. Block error rate (BLER) measured by CD-CATS was less than 10, a value generally accepted by the users. The above characters of the compact disc made with cyanine dyes mixture of this invention indicate that the aforementioned cyanine dyes mixture can successfully serve as optical disc recording media.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mixture of cyanine dyes (Ia and Ib) having the general structural formula:

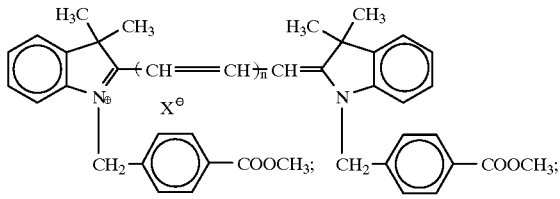

wherein $X^-$ is an acid anion; and n is 2 for cyanine dye (Ia) and n is 3 for cyanine dye (Ib).

2. A mixture of cyanine dyes as claimed in claim 1, wherein $X^-$ is selected from the group consisting of halogen anion, alkylsulfate anion, arylsulfonate anion and perchlorate anion; and n is 2 for cyanine dye (Ia) and n is 3 for cyanine dye (Ib).

3. A mixture of cyanine dyes as claimed in claim 1, wherein $X^-$ is perchlorate anion; and n is 2 for cyanine dye (Ia) and n is 3 for cyanine dye (Ib).

4. A mixture of cyanine dyes as claimed in claim 1, wherein the weight percentage of the cyanine dye (Ib) to the cyanine dye (Ia) is 1% to 8%.

5. A cyanine dyes mixture as claimed in claim 1, wherein the weight percentage of the cyanine dye (Ib) to the cyanine dye (Ia) is in the range between 3.5% to 5%.

6. A cyanine dye mixture as claimed in claim 1, wherein the cyanine dye (Ia) and the cyanine dye (Ib) are solved in an organic solvent.

7. A mixture of cyanine dyes as claimed in claim 6, wherein the weight percentage of the cyanine dye (Ia) to the total weight, including the cyanine dye (Ia), cyanine dye (Ib) and the organic solvent, is 0.5% to 5%.

8. A mixture of cyanine dyes as claimed in claim 6, wherein the weight percentage of the cyanine dye (Ia) to the total weight, including the cyanine dye (Ia), cyanine dye (Ib) and the organic solvent, is in the range between 1.3% to 1.7%.

9. A mixture of cyanine dyes as claimed in claim 6, wherein the organic solvent is 2,2.3,3-tetrafluoropropanol.

10. A mixture of cyanine dyes as claimed in claim 6, wherein the organic solvent is alcohol.

11. A mixture of cyanine dyes as claimed in claim 6, wherein the organic solvent is ketone.

12. A mixture of cyanine dyes as claimed in claim 6, wherein the organic solvent is ether.

13. A mixture of cyanine dyes as claimed in claim 6, wherein the organic solvent is chloroform.

14. A mixture of cyanine dyes as claimed in claim 6, wherein the organic solvent is dichloromethane.

15. A mixture of cyanine dyes as claimed in claim 6, wherein the organic solvent is dimethylformamide.

* * * * *